United States Patent [19]
Watanabe et al.

[11] Patent Number: 4,969,962
[45] Date of Patent: Nov. 13, 1990

[54] MAGNETIC ALLOYS FOR MAGNETIC HEAD

[75] Inventors: Yasushi Watanabe; Hirofumi Imaoka, both of Yokosuka, Japan

[73] Assignee: Victor Company of Japan, Ltd., Japan

[21] Appl. No.: 394,459

[22] Filed: Aug. 16, 1989

[30] Foreign Application Priority Data

Aug. 20, 1988 [JP] Japan .................................. 63-207136
Feb. 16, 1989 [JP] Japan .................................... 1-35071

[51] Int. Cl.$^5$ ............................................. C22C 38/00
[52] U.S. Cl. .................................... 148/306; 148/307; 420/128; 252/62.56
[58] Field of Search ................ 148/306, 307; 420/128; 252/62.55, 62.56, 62.59; 501/96, 97

[56] References Cited

U.S. PATENT DOCUMENTS

| | | | |
|---|---|---|---|
| 4,439,251 | 3/1984 | Shimoyama et al. | 148/307 |
| 4,748,000 | 5/1988 | Hayashi et al. | 148/307 |
| 4,762,755 | 8/1988 | Shiiki et al. | 148/307 |

FOREIGN PATENT DOCUMENTS

| | | | |
|---|---|---|---|
| 137241 | 8/1979 | German Democratic Rep. | 148/307 |
| 156651 | 9/1982 | German Democratic Rep. | 148/306 |
| 60-25012 | 2/1985 | Japan . | |
| 62-210607 | 9/1987 | Japan . | |

OTHER PUBLICATIONS

Kijima et al., "Structural and Soft Magnetic Properties of Nitrogen Added Iron Film Prepared by Sputter—Deposition", Information Systems Research Center, Sony Corp., vol. 12, No. 2, 1988.
Arai et al., "Magnetic Properties of Fe—Si Thin Films Sputtered in Mixed Gas Atmosphere", Res. Inst. of Elect. Comm., Tohoku Unive., 2—1—1 Katahira, Sandai 980, 1989.

Primary Examiner—Theodore Morris
Assistant Examiner—George Wyszomierski
Attorney, Agent, or Firm—Lowe, Price, LeBlanc, Becker & Shur

[57] ABSTRACT

Novel magnetic alloys for magnetic heads are provided and are broadly of the formula, Fe-O-N. In a more specific embodiment, the alloys are of the compositional formula, $Fe_vN_wO_xM_y$, wherein M represents a member selected from the group consisting of Ta, Nb, Si and mixtures thereof, and v, w, x and y are, respectively, such values by atomic percent that $1 \leq w \leq 20$, $1 \leq x \leq 20$ and $0.5 \leq y \leq 6$ provided that $v+w+x+y=100$. These alloys may further comprise at least one element of the platinum group or of group VIa of the periodic table in an amount of from 0.3 to 3 atomic percent in total so that their resistance to corrosion is improved.

11 Claims, 5 Drawing Sheets

MAGNETIC ALLOYS FOR MAGNETIC HEAD

BACKGROUND OF THE INVENTION

1. Field of the Invention

This invention relates to magnetic alloys for magnetic heads which are suitable for use particularly in high density magnetic recording.

2. Description of the Prior Art

In recent years, necessity for high density and wide frequency band recording in the magnetic recording art has increased. At present, high density recording and reproducing has been realized wherein magnetic materials having a high coercive force are used in magnetic recording media and the recording tracks are made narrow in width.

It is considered necessary that magnetic alloys whose saturation magnetic flux density is high be used as a magnetic material for magnetic heads used to record and reproduce information in magnetic recording media having high coercivity. Currently proposed magnetic heads make use of Fe-Si-Al alloys (Sendust alloys) or amorphous alloys in part or all of the head core. However, magnetic recording media now tend toward a higher coercivity than ever experienced. For instance, when the coercivity exceeds 2,000 Oe, it has been difficult to record and reproduce information of high quality when using magnetic heads made of Fe-Si-Al alloys or amorphous alloys.

On the other hand, a vertical magnetization recording system has been proposed and put into practice wherein information is recorded by magnetizing a recording layer along the thickness thereof, not along the horizontal direction of the medium. In order that the vertical magentization recording system is well performed, the magnetic head should have a thickness of not higher than 0.5 micrometers at the tip portion of the main magnetic pole. Accordingly, it is considered that the magnetic head should have a high saturation magnetic flux density even for recording on a magnetic recording medium with a relatively low coercivity. Known alloys for magnetic heads which have a saturation magnetic flux density higher than Fe-Si-Al alloys or amorphous alloys are those magnetic alloys having a major proportion of iron such as, for example, iron nitride, Fe-Si alloys and the like. These known magnetic alloys having a high saturation magnetic flux density also have a high coercive force and are thus unsatisfactory for use as a magnetic head. To avoid this, there have been proposed magnetic heads of a multi-layered structure wherein a magnetic material having a small coercive force such as Fe-Si-Al alloys or Permalloys is used as a layer film or films.

For example, if iron nitride, which is a magnetic alloy having a high saturation magnetic flux density, is used, its magnetic characteristics become poorer at a larger thickness. When a thickness of larger than 1 micrometer is necessary, a multi-layered film using other types of magnetic alloys or insulating materials should be used.

As will be apparent from the above, for the fabrication of a magnetic head having a high saturation magnetic flux density, magnetic alloys have to be used as a multi-layered structure. The multi-layered structure undesirably requires additional steps and/or costs, presenting the problem that reliability is difficult to maintain.

SUMMARY OF THE INVENTION

It is accordingly an object of the invention to provide a novel alloy for magnetic heads which enables one to provide a magnetic head having a small coercive force while keeping a high saturation magnetic flux density without resorting to the multi-layered structure.

It is another object of the invention to provide an alloy which exhibits good magnetic characteristics when applied as a thin film magnetic head and can be processed in a desired core thickness without forming a multi-layered structure.

It is a further object of the invention to provide alloys which are suitable for use as a magnetic head and are resistant to corrosion with good thermal stability in addition to the desired magnetic characteristics as mentioned above.

It is a still further object of the invention to provide alloys which are able to realize high density recording and reproducing systems when applied as a magnetic head.

Broadly, the present invention provides a magnetic alloy which is adapted for use as a magnetic head and which comprises a major proportion of iron and a minor proportion of nitrogen. The alloy is characterized by further comprising oxygen in an amount of from 1.5 to 15 atomic percent. Preferably, nitrogen is contained in an amount of from 3 to 20 atomic percent with the balance being iron.

In a specific embodiment, there is provided a magnetic alloy which comprises an alloy of the following compositional formula, $Fe_vN_wO_xM_y$, wherein M represents a member selected from the group consisting of Ta, Nb, Si and mixtures thereof, and v, w, x and y are, respectively, such values by atomic percent that $1 \leq w \leq 20$, $1 \leq x \leq 20$ and $0.5 \leq y \leq 6$ provided that $v+w+x+y=100$.

The alloy of the above compositional formula may further comprise from 0.3 to 3 atomic percent of a platinum group element or an element of the group VIa of the periodic table in order to improve corrosion resistance provided that the total content of Fe, N, O, the element such as Ru or Cr and M is 100 atomic percent. The element of the platinum family element includes, for example, Pt, Ru and the like, of which ruthenium (Ru) is preferred. Examples of the element of the goup VIa include Cr, W, Mo and the like, of which Cr is preferred.

DETAILED DESCRIPTION AND EMBODIMENTS OF THE INVENTION

Figure 1:
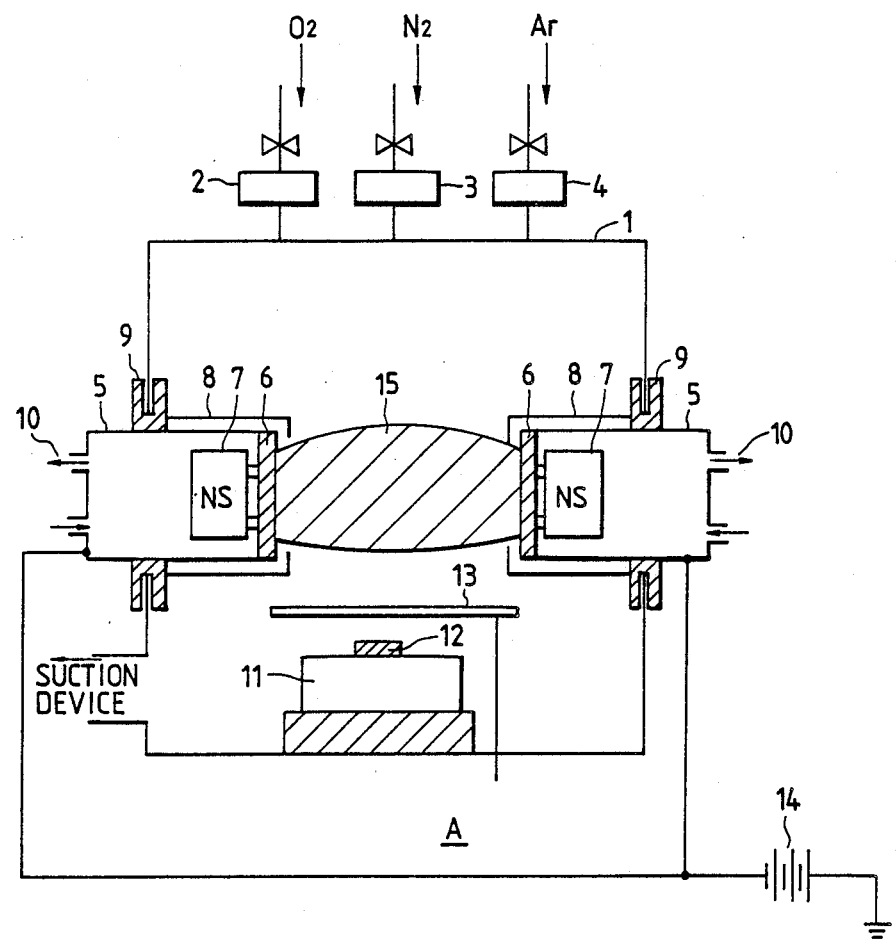
FIG. 1 is a sputtering apparatus for making magnetic alloys for magnetic head according to the invention.

Reference is now made to the accompanying drawings and particularly, to FIG. 1 which illustrates a sputtering apparatus for making a magnetic alloy.

In the figure, there is generally shown a sputtering apparatus A which includes a vacuum vessel 1 having flow meters 2, 3 and 4 for $O_2$, $N_2$ and Ar connected thereto, respectively. The vacuum vessel 1 has at opposite sides thereof a pair of target holders 5 each having a target 6 and a magnet 7 as shown. Each target holder 5 is shielded as 8 and is insulated as 9. Each holder 5 has ports 10 through which cooling water is charged from one port and discharged from other port to cool the target 6. At a lower portion of the vacuum vessel 1 is provided a substrate holder 11 on which a substrate 12 is mounted. Indicated at 13 is a shutter for covering the substrate 12 to prevent impurities from incorporation, and at 14 is a DC source connected to the target holders 5 for generating a plasma 15.

In operation, $O_2$, $N_2$ and Ar gases are initially introduced through the respective flow meters 2, 3 and into the vacuum vessel 1 in amounts as desired.

A pair of the targets 6 made of pure iron with or without additive elements such as Ta, Nb, Si, the element of a platinum group or the group VIa, or a mixture thereof is provided. If the additive element is used, the target may be an alloy of Fe and the additive element, or may be a composite target wherein a pure iron target with a recess is used and a chip of the additive element is inserted into the recess. The targets 6 and the target holders 5 are applied with a minus potential from the DC source 14. As a result, the plasma 15 is generated between the targets 6 as focussed by means of the magnets 7, whereupon the argon in the vessel 1 is ionized in the plasma as $Ar^+$. The $Ar^+$ ions in the plasma collide with the targets 6 which has been subjected to minus potential. This eventually causes the atoms of iron and/or additive elements to be discharged. The thus discharged iron atoms with or without the atoms of the other additive elements are combined with oxygen and nitrogen atoms or molecules and grow on the substrate 12.

For several minutes after commencement of the sputtering, the shutter 13 is provided to cover the substrate 12 so that the impurities on the surface of the targets 6 are not deposited on the substrate. Thereafter, the shutter 13 is removed.

The flow rates of the gases including $O_2$, $N_2$ and Ar are, respectively, controlled by the use of the flowmeters 2, 3 and 4. By the control, an alloy of the formula, Fe-O-N or $Fe_y N_w O_x M_y$ with or without Ru may be obtained in desired amounts of oxygen and nitrogen. It will be noted that argon is used to indirectly control the amounts of of oxygen and nitrogen in final magnetic alloy films which have been formed simultaneously with the sputtering.

In this manner, several types of magnetic alloys according to the invention and for comparison are made.

First, the saturation magnetic flux density (Bs) and coercive force (Hc) in relation to the contents of oxygen and nitrogen in an Fe-N-O alloy film having a thickness of 1 micrometer after thermal treatment at 300° C. are shown in Table 1.

For reference, those characteristics of pure iron are also shown in the table.

TABLE 1

| Sample No. | Content of Nitrogen (Atomic %) | Content of Oxygen (%) (Atomic %) | Bs (kG) | Hc (Oe) |
|---|---|---|---|---|
| 1 | 20 | 2.0 | 18 | 1.2 |
| 2 | 7.2 | 3.9 | 18 | 0.8 |
| 3 | 13 | 13 | 17 | 0.5 |
| 4 | 11 | 0 | 20 | 2.3 |
| 5 | 9.5 | 17 | 10 | 4 |
| 6 | 25 | 6.7 | 13 | 2.3 |
| 7 | 0 | 0 | 21 | 10 |

As will be seen from Table 1 wherein sample Nos. 1 to 3 are the alloys of the invention, sample Nos. 4 to 7 are for comparison and for reference, the contents of oxygen and nitrogen in the Fe-N-O alloy give an appreciable influence on the saturation magnetic flux density (Bs) and the coercive force (Hc). Good results are obtained when the contents of N and O are, respectively, in the ranges of from 3 to 20 atomic percent and from 1.5 to 15 atomic percent.

Figure 2:
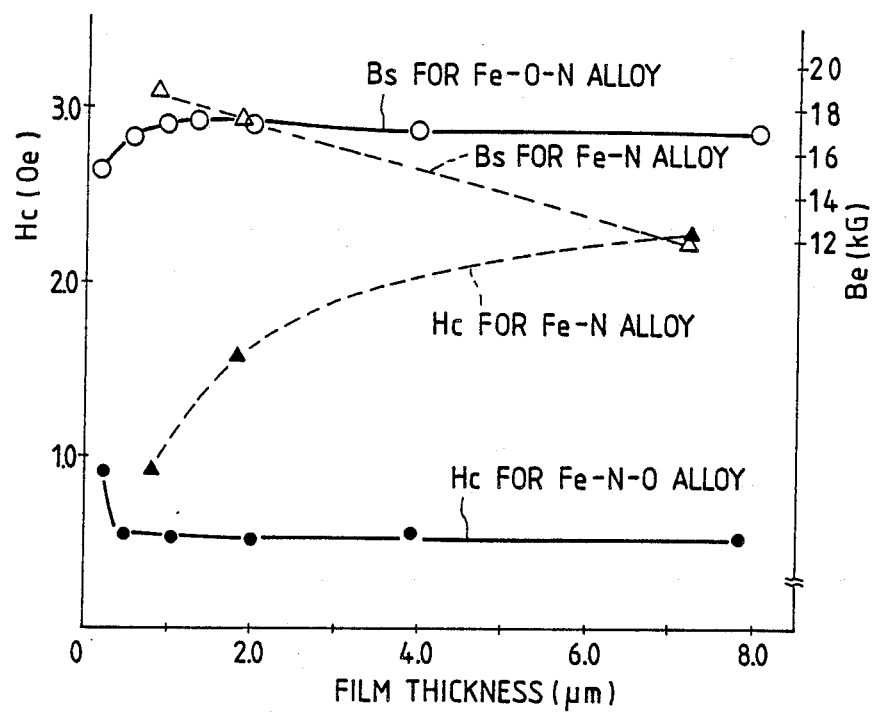
FIG. 2 is a graphical representation of a coercive force (Hc) and a saturation magnetic flux density (Bs) in relation to the variation in thickness of a magnetic alloy film.

Moreover, the Fe-N-O alloy having a composition comprising 3 atomic percent of oxygen and 3 atomic percent of nitrogen is formed on a crystallized glass substrate containing oxides in different thicknesses to determine saturation magnetic flux density (Bs) and coercive force (Hc). The relation between the thickness and Bs or Hc is shown in FIG. 2 along with the relation for an Fe-N alloy.

From the figure, the saturation magnetic flux density (Bs) increased with an increase of the thickness when the thickness is up to 0.5 micrometers, but the coercive force (Hc) decreases. When the thickness exceeds 0.5 micrometers, the saturation magnetic flux density (Bs) and the coercive force (Hc) are, respectively, saturated substantially at values of about 1.7 kG and about 0.5 Oe. Accordingly, when the Fe-N-O alloy is formed as a film on a crystallized glass substrate containing oxides, its thickness should preferably be not less than 0.5 micrometers in order to obtain good magnetic characteristics.

On the other hand, the Fe-N alloy increases in Hc value and decreases in the Bs value with an increase of the film thickness.

Moreover, alloys of the FeNOM type wherein M represents a member selected from the group consisting of Ta, Nb, Ru and mixtures thereof are made using the apparatus described with reference to FIG. 1. After thermal treatment at 300° C., the alloys in the form of a film having a thickness of 1 micrometer are subjected to measurement of saturation magnetic flux density (Bs) and coercive force (Hc). The results are shown in Table 2.

TABLE 2

| Sample No. | Contents of elements (atomic %) | | | | | | Bs (kG) | Hc (Oe) |
| | O | N | Ta | Nb | Si | Ru | Fe | |
|---|---|---|---|---|---|---|---|---|
| 8 | — | — | — | — | — | — | 100 | 21.5 | 10 |
| 9 | 8.0 | — | — | — | — | — | balance | 10 | 40 |
| 10 | — | 5.6 | — | — | — | — | balance | 18.5 | 1.2 |
| 11 | 3.5 | 5.3 | — | — | — | — | balance | 17 | 0.5 |
| 12 | 3.8 | 4.1 | 1.8 | — | — | — | balance | 17 | 0.2 |
| 13 | 4.5 | 3.6 | — | 1.5 | — | — | balance | 18 | 0.3 |
| 14 | 1.0 | 5.4 | — | 0.3 | — | 0.2 | balance | 17 | 0.6 |
| 15 | 9.8 | 4.4 | 3.8 | — | — | — | balance | 15.5 | 0.8 |
| 16 | 3.0 | 1.0 | 2.2 | — | — | 0.3 | balance | 17 | 0.5 |
| 17 | 5.3 | 9.9 | — | 1.1 | — | 1.5 | balance | 15 | 0.6 |
| 18 | 3.4 | 3.2 | — | 2.5 | — | 2.9 | balance | 16 | 0.3 |
| 19 | 2.5 | 19.3 | 1.0 | — | — | — | balance | 10 | 1.0 |
| 20 | 19.4 | 3.7 | 1.1 | — | — | — | balance | 11 | 1.0 |
| 21 | — | — | — | — | 1.5 | — | balance | 19 | 8.0 |
| 22 | 4.7 | — | — | — | 5.1 | — | balance | 16.5 | 0.3 |

TABLE 2-continued

| Sample No. | Contents of elements (atomic %) | | | | | | | Bs (kG) | Hc (Oe) |
|---|---|---|---|---|---|---|---|---|---|
| | O | N | Ta | Nb | Si | Ru | Fe | | |
| 23 | 2.5 | 3.8 | 1.5 | 0.5 | 0.5 | — | balance | 17 | 0.2 |
| 24 | 2.6 | 3.7 | — | — | 2.0 | — | balance | 17 | 0.1 |
| 25 | 1.0 | 9.6 | — | — | 1.5 | — | balance | 15 | 0.5 |
| 26 | 9.8 | 1.0 | — | — | 6.0 | — | balance | 13 | 0.5 |
| 27 | 2.8 | 5.8 | — | — | 0.5 | — | balance | 17 | 0.3 |
| 28 | 3.4 | 3.2 | — | — | 2.5 | 1.0 | balance | 16 | 0.3 |
| 29 | 2.5 | 19.3 | — | — | 1.5 | — | balance | 10 | 1.0 |
| 30 | 19.4 | 3.7 | — | — | 1.5 | — | balance | 11 | 1.0 |

In the above table, the saturation magnetic flux density (Bs) and the coercive force (Hc) are shown relative to the contents of Ta, Nb, Si and/or Ru. The contents are measured by quantitative analyses including electron spectroscopy for chemical analysis (ESCA) and electron probe microanalysis (EPMA) and are expressed by atomic percent. The analytic error will be approximately ±20%. The coercive force is a value which is determined after thermal treatment at 300° C. in vacuum. As will be seen from the table, sample No. 8 is iron alone, sample No. 9 is iron to which oxygen has been added, and sample No. 10 is iron to which nitrogen has been added. In addition, sample Nos. 21 and 22 are, respectively, an alloy of Fe and Si and an alloy of Fe, O and Si. These samples are for comparison. Sample Nos. 11 to 20 and Nos. 23 to 30 are magnetic alloys of the invention. In certain comparative alloys, relatively good results are obtained. For instance, sample No. 23 is an Fe-Si-O alloy which has a low Hc value, but this value increases abruptly at a thermal treatment temperature of higher than 300° C. This is disadvantageous in that the alloy is applied as a magnetic head by a glass molding technique which is a typical working process for making a magnetic head. The sample No. 21 which is an Fe-Si alloy has too high a Hc value. In addition, the Fe-N alloy No. 10 has a relatively small Hc value but the value is higher than 1.0 and is unsatisfactory for use as a magnetic head. In paricular, the Fe-N alloy is also unsatisfactory with respect to thermal stability.

The results of the table reveal that when the content of oxygen is less than 1 atomic percent, an appreciable effect of the addition of oxygen is not found, i.e. the coercive force rarely lowers. Over 20 atomic percent, the soft magnetic characteristics deteriorate considerably, i.e. the Bs value lowers with an increase of the Hc value. Accordingly, the content of oxygen is in the range of from 1 to 20 atomic percent, preferably from 1 to 10 atomic percent. Within this range, the magnetic alloy has a high Bs value and a small Hc value.

When the content of nitrogen is less than 1 atomic percent, an appreciable improvement of the magnetic characteristics is not found. Over 20 atomic percent, the Bs value lowers and the Hc value increases. Thus, a high Bs value cannot be attained. Accordingly, the content of nitrogen is in the range of from 1 to 20 atomic percent, preferably from 1 to 10 atomic percent, within which the resultant magnetic alloy has a high Bs value with a small Hc value.

Figure 3:
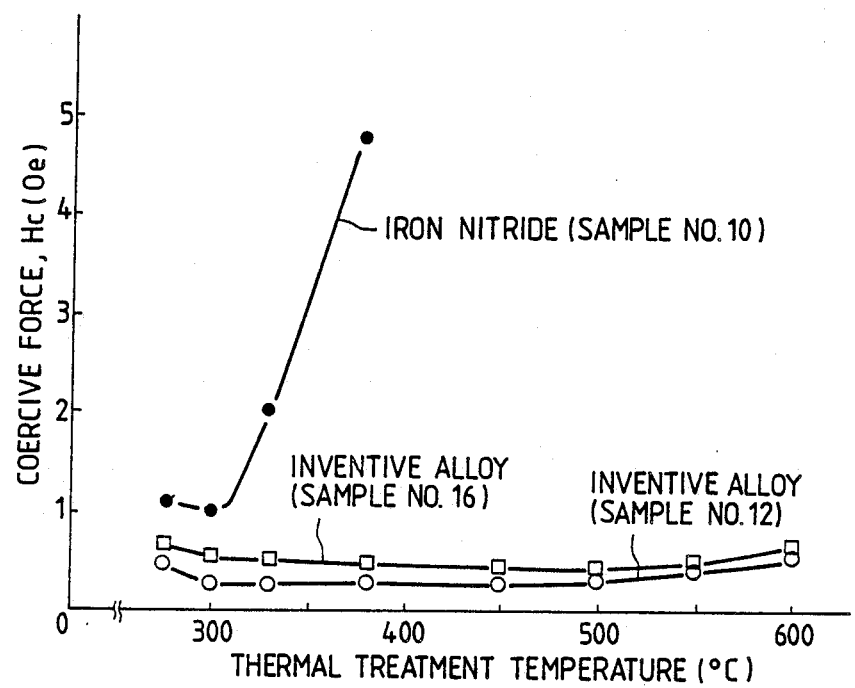
FIG. 3 is a graphical representation of the coercive force in relation to the variation in thermal treatment temperature for different magnetic alloys.

In FIG. 3, there is shown the coercive force relative to the thermal treatment temperature for the known iron nitride alloy No. 10 and the alloys Nos. 12 and 16 of the invention. As will be seen from FIG. 3, the magnetic alloys of the invention exhibit small Hc values and thus have good thermal stability. However, if the content of Ta and/or Nb is less than 0.5 atomic percent, the Hc value does not lower and the thermal stability is not significantly improved. Over 6 atomic percent, magnetic alloys having a high Bs value and a low Hc value with good thermal stability cannot be obtained. Thus, the total content of these additive elements is in the range of from 0.5 to 6 atomic percent.

Figure 4:
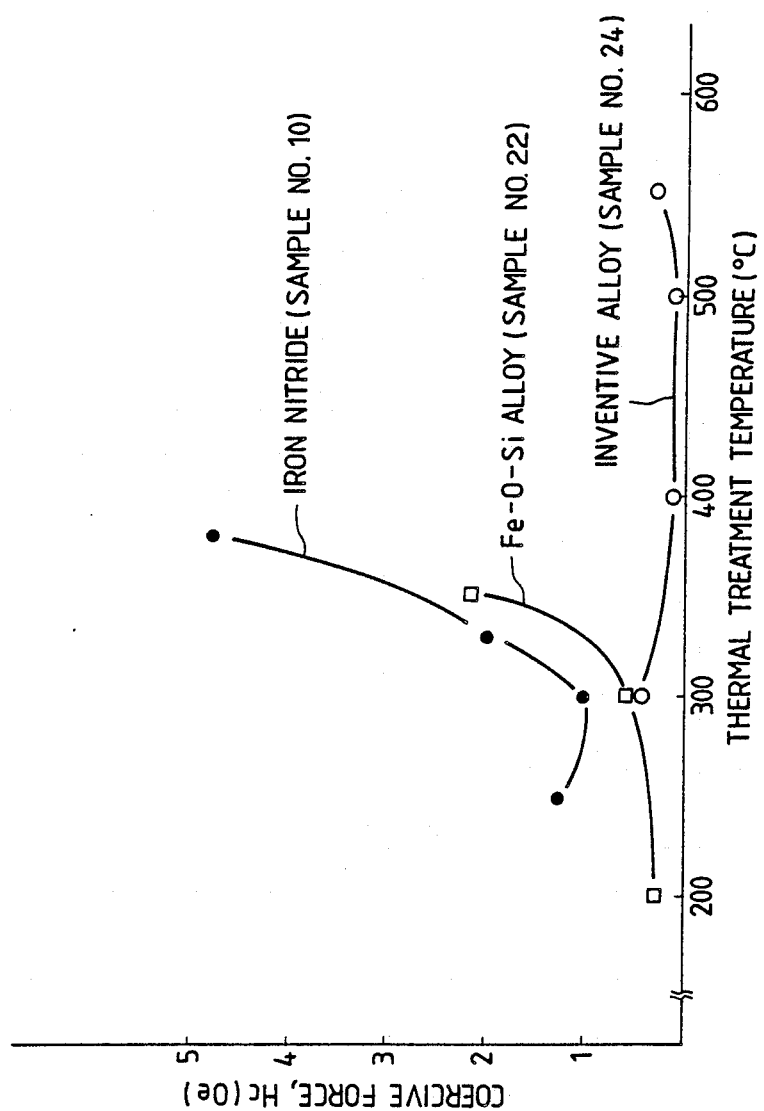
FIG. 4 is a graphical representation of the coercive force in relation to the variation in thermal treatment temperature for different magnetic alloys.

FIG. 4 shows the variation in the coercive force in relation to the thermal temperature for the comparative alloy Nos. 10 and 22 and the Fe-O-N-Si alloy No. 24 of the invention. From this, the Fe-O-N-Si alloy has a low Hc value and good thermal stability. If the content of Si is less than 0.5 atomic percent, a significant effect on the Hc and thermal stability will not be expected. Over 6 atomic percent, the Hc value increases considerably with a lowering of the Bs value. Accordingly, the Si content is in the range of from 0.5 to 6 atomic percent.

Hence, the alloy of the compositional formula, $Fe_vN_wO_xM_y$, wherein M represents a member selected from the group consisting of Ta, Nb, Si and mixtures thereof, should satisfy the requirement that v, w, x and y are, respectively, such values by atomic percent that $1 \leq w \leq 20$, $1 \leq x \leq 20$ and $0.5 \leq y \leq 6$ provided that $v+w+x+y=100$. If a mixture is used as M, it includes Ta and Nb, Ta and Si, Nb and Si, and Ta, Nb and Si, of which a mixture of Ta and Si is preferred.

Figure 5:
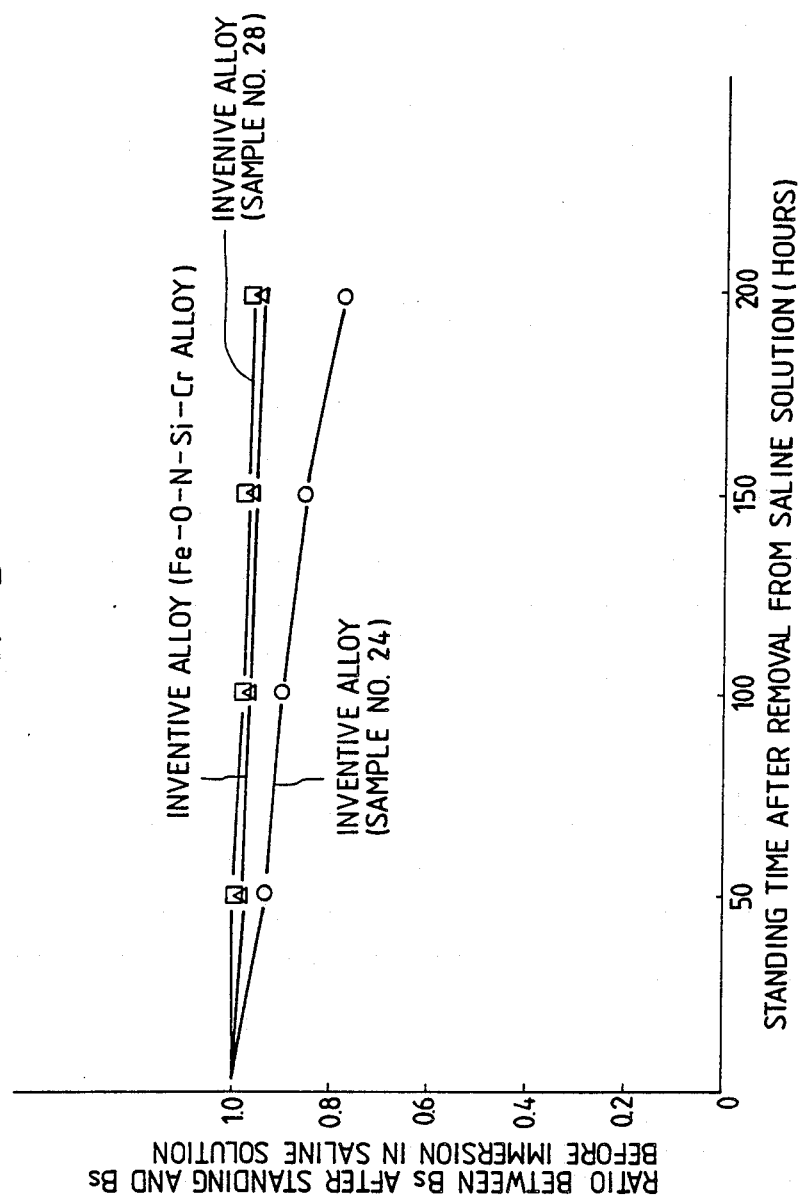
FIG. 5 is a graphical representation of the ratio of Bs values prior to immersion of magnetic alloys in saline solution and after the immersion in relation to the variation in standing time after the immersion in the saline solution.

Moreover, the corrosion resistance of the alloy set forth above is significantly improved when an element of the platinum group or the group VIa of the periodic table is further added. This has been experimentally confirmed by a test wherein a sample is immersed in a 2 wt % saline solution for one hour after which it is removed from the solution and allowed to stand in a thermo-hygrostatic chamber controlled under conditions of 60° C. and 90% R.H. The corrosion resistance is determined by measuring the saturation magnetic flux density Bs prior to the immersion and after standing and taking a ratio of the Bs value after the standing and the Bs value prior to the immersion in relation to the standing time. The alloy Nos. 24 and 28 and an Fe-O-N-Si-Cr alloy having a similar composition as the alloy No. 28 wherein Ru is replaced by Cr are tested. The results are shown in FIG. 5 wherein the y axis is the ratio and the x axis is the standing time. From the figure, the Ru-containing alloy No. 28 and the Cr-containing alloy are better than the Ru-free alloy No. 24. If the Ru or Cr content is less than 0.3 atomic percent, the corrosion resistance is not significantly improved. Over 3 atomic percent, the Bs and Hc characteristics are adversely influenced. Accordingly, the Ru or Cr content is from 0.3 to 3 atomic percent provided that the total content of Fe, O, N, Ru or Cr and M is 100 atomic percent. The Ru and Cr elements have been used in the above test, but similar results are obtained with other elements of the platinum group and the group VIa of the periodic table. The elements of the platinum group or the group VIa of the periodic table may be used singly or in combination provided that the total content of the elements used in combination is in the range of from 0.3 to 3 atomic percent.

The alloys of the invention exhibit good magnetic characteristics when used as a single-layer structure. As a matter of course, the alloys of the invention may be used as a multi-layered structure wherein the alloy layers of the invention and the layers of other soft magnetic alloys such as an Fe-Si-Al alloy are alternately superposed.

What is claimed is:
1. A magnetic alloy of the following compositional formula, $Fe_vN_wO_xM_y$, wherein M represents a member selected from the group consisting of Ta, Nb, Si and mixtures thereof, and v, w, x and y are, respectively, such values by atomic percent that $1 \leq w \leq 20$, $1 \leq x \leq 20$ and $0.5 \leq y \leq 6$ provided that $v+w+x+y=100$.

2. The magnetic alloy according to claim 1, wherein M is Si.

3. The magnetic alloy according to claim 1, wherein M is Ta.

4. The magnetic alloy according to claim 1, wherein M is Nb.

5. The magnetic alloy according to claim 1, wherein M is a mixture of Ta and Si.

6. The magnetic alloy according to claim 1, wherein $1 \leq x \leq 10$.

7. The magnetic alloy according to claim 1, wherein $1 \leq w \leq 10$.

8. The magnetic alloy according to claim 1, further comprising from 0.3 to 3 atomic percent of at least one metal of the platinum group or of group VIa of the periodic table provided that the total content of Fe, O, N, the at least one metal and M is 100 atomic percent.

9. The magnetic alloy according to claim 8, wherein said at least one metal is Ru.

10. The magnetic alloy according to claim 8, wherein said at least one metal is Cr.

11. A magnetic alloy which is adapted for use as a magnetic head and which consists essentially of from 3 to 20 atomic percent of nitrogen, from 1.5 to 15 atomic percent oxygen and the balance of iron.

* * * * *